April 28, 1942.     M. O. TEETOR     2,281,123
PISTON RING
Filed Nov. 20, 1939     2 Sheets-Sheet 1
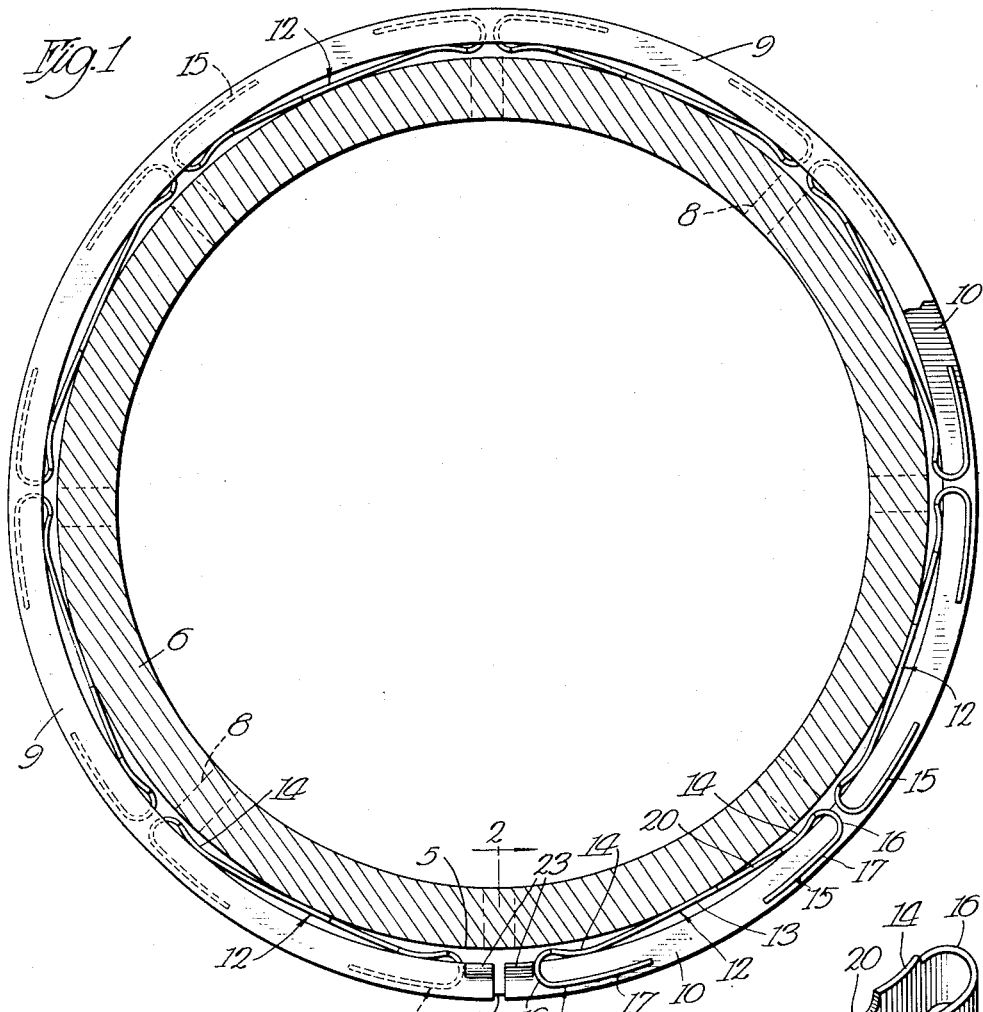
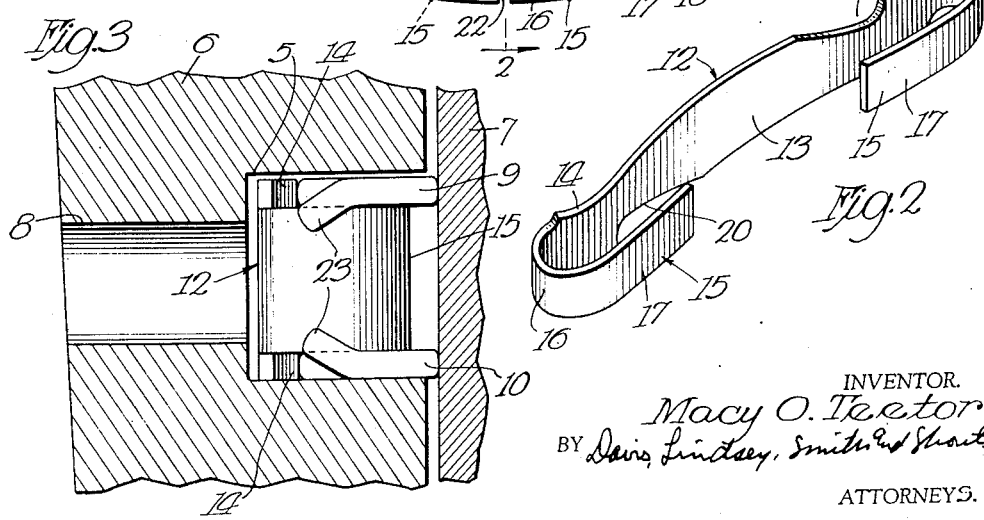
INVENTOR.
Macy O. Teetor
BY Davis, Lindsey, Smith and Shorts
ATTORNEYS.

April 28, 1942.  M. O. TEETOR  2,281,123
PISTON RING
Filed Nov. 20, 1939   2 Sheets-Sheet 2
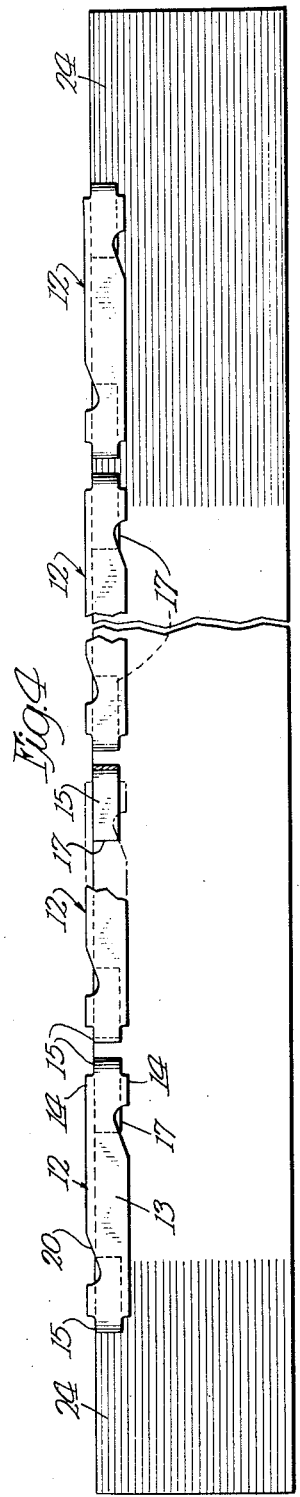
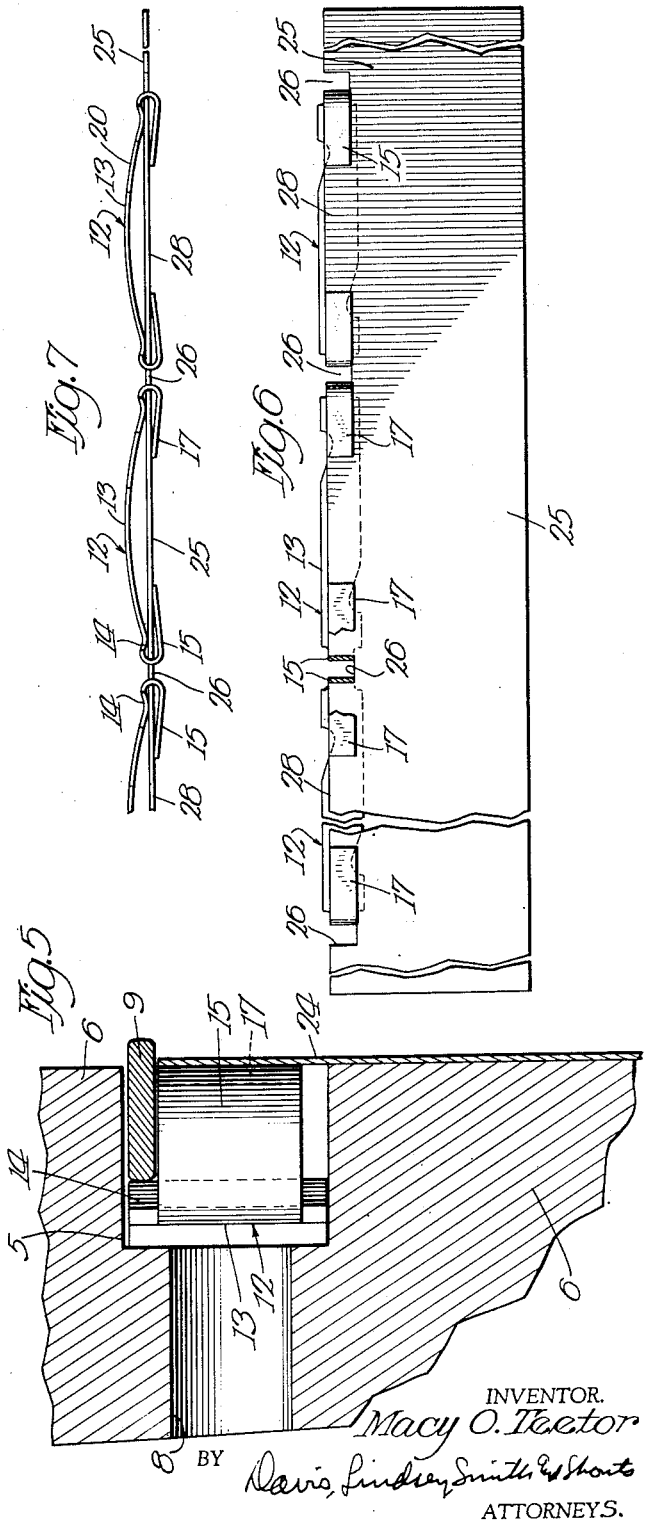
INVENTOR.
Macy O. Teetor
BY Davis, Lindsey, Smith & Shouts
ATTORNEYS.

Patented Apr. 28, 1942　　　　　　　　　　　　　　　　2,281,123

UNITED STATES PATENT OFFICE 2,281,123

PISTON RING

Macy O. Teetor, Newcastle, Ind., assignor to The Perfect Circle Company, Hagerstown, Ind., a corporation of Indiana Application November 20, 1939, Serial No. 305,213

5 Claims. (Cl. 309—44)

My invention relates to piston rings adapted for use in internal combustion engines.

The principal object of my invention is to provide a multi-part piston ring having a pair of thin, ring-like sections or rails and improved means for maintaining the rails in spaced relation and expanding the rails against the cylinder wall of the engine. To this end I provide a series of spacer-expander members or elements formed of thin spring strip or ribbon, the members having portions located between the bottom of the piston groove and the inner peripheries of the rails for expanding the rails and also having end portions of reduced width which project between and serve to maintain the rails apart in the desired spaced relation.

Another object of my invention is to provide novel means and a novel method for assembling my piston ring in the groove of the piston.

Other objects and advantages will become apparent as this description progresses and with reference to the drawings wherein—

Fig. 1 is a horizontal section through the ring groove of the piston and shows a ring structure embodying my invention mounted therein, the ring structure being illustrated in the condition it assumes when confined within the cylinder of the engine;

Fig. 2 is a perspective view of one of the spacer-expander members in unconfined condition;

Fig. 3 is a fragmentary vertical sectional view and illustrates the ring structure in operative relation to the cylinder wall, the section being taken on the line 2—2 of Fig. 1;

Fig. 4 is a side view of a flexible strip of material and shows a series of spacer-expander members secured along one edge of the strip to facilitate assembly of the ring in the groove of the piston;

Fig. 5 is a fragmentary sectional view and illustrates one step of the assembling operation of the ring in the groove of the piston;

Fig. 6 is a side view of a modified form of strip and shows the spacer-expander members in position thereon; and Fig. 7 is a top plan view of a portion of the strip and members shown in Fig. 6.

The ring embodying my invention is adapted to be mounted in a groove 5 of a piston 6 of an internal combustion engine, the piston being of any desired structure and operating within a cylinder 7. The back of the ring groove is provided with the usual drain openings 8 through which the excess oil scraped from the cylinder wall, is drained back to the crank case of the engine.

The ring structure which I have illustrated in the drawings, includes a pair of thin, flat, split ring-like rails 9 and 10, preferably formed of steel, and a series of spring expander spacing elements 12 formed of thin strip or ribbon material, such as steel. The rails are flat.

Each of the spacer-expander elements has a main body portion 13 having a width (that is an axial height as viewed in Fig. 2) only slightly less than the width of the piston groove 5. The body or expander portion 13, when the element is free, that is unconfined, is bowed slightly in one direction as best shown in Fig. 2. The body portion adjacent each end is curved slightly forming slight vertical ridges 14. The end or spacing portions 15 of each element are reduced in width, each edge being cut away substantially the width of each of the rails and the opposite edges being parallel to each other. These spacing portions are first semicircularly curved as at 16 and they then extend toward each other a substantial distance sufficient to provide suitable circumferential support for the rails 9 and 10, the parts 17 beyond the curves 16 being slightly arcuate and substantially concentric with the rails 9 and 10.

With the ring assembled in the piston groove and confined by the cylinder wall, the centers of the body or expanding portions 13 of the spacer-expander elements, rest against the bottom of the piston groove, the ridges 14 engage against the inner peripheries of the rails 9 and 10, and the spacing portions 15 project between the rails to space and maintain them apart. The edges of the spacing portions are parallel to each other and to the flat parallel rails. The rails being confined by the cylinder wall, the expanding portions 13, as shown in Fig. 1, are now slightly bowed in the reverse direction from that in which they are bowed when unconfined. The centers of the expanding portions press firmly against the bottom of the piston groove and the ridges 14 push firmly outwardly against the inner peripheries of the rail to expand the rails and hold their outer edges in engagement with the cylinder wall.

The edges of the body portions of the spacer-expander elements are provided with notches 20 to facilitate the drain of the oil past these elements.

The joints 22 of the two rails may be in or out of alignment with each other, as may be desired. Each end of each rail is provided with a struck out inclined lug 23 (Figs. 1 and 3). As shown in Fig. 1, the joint of and lugs 23 on the upper rail are positioned in the space between adjacent ends of two of the spacer-expander elements, the lugs serving to prevent any material relative rotation between the rail and the elements.

In Fig. 4, I have shown the number of spacer-expander elements, required for one ring, secured in alignment along the upper edge of a flexible strip 24, which may be of paper, for example. The portions 17 of the elements lie against the strip and are bonded thereto as by means of any suitable glue. The upper edges of the spacing portions of the elements are flush with the upper edge of the strip so that the upper side margins of the body portions of the elements project beyond the upper edge of the strip. In assembling the elements of the ring in a piston groove (Fig. 5) the flexible strip is wrapped around the piston with the spacer-expander elements on the inside and with the body portions projecting into the groove of the piston. If desired the strip may be pasted to the piston but it may be held in position by the fingers of the mechanic. Then the upper rail of the ring is placed in position between the upper side of the piston groove and the spacing portions 15 of the spacer-expander elements as illustrated in Fig. 5. With the upper rail in this position it firmly holds elements in the piston groove so that now the paper strip may be removed, leaving the elements in position. Finally the lower rail is placed in position and the assembly of the ring structure has been completed.

Figs. 6 and 7 show a modification of the means for carrying the series of spacer-expander elements in order to facilitate assembly of the ring. In this modification a band 25, formed of thin flexible metal, is provided with a series of notches 26 in its upper edge, the depth of the notches being the same as the axial height of the spacing portions 15 of the spacer-expander elements. These notches form spaced portions 28 which are only slightly longer than the inside lengths of the spacer-expander elements. As shown, the spacer-expander elements are placed around the portions 28 and are held in position by the tension of the elements exerted on the ends of the portions 28. As the notches have a depth the same as the axial height of the spacing portions 15, the upper edge margins of the expander portions project above the upper edge of the strip. As in the form shown in Figs. 4 and 5, the metal strip is wrapped around the piston with the expanding portions of the spacer-expander elements projecting into the piston groove. Then the upper rail is placed in position and the strip is slid downwardly to release the elements from the strip. Finally the lower rail is placed in position.

From the foregoing it will be clear that I have provided a ring assembly which is very simple in construction and low in cost. The spacer-expander elements are easily and quickly made and are readily assembled behind the rails in the piston grooves. At the same time the ring is highly efficient in operation. Each spacer-expander element is free to act independently of the others so that there is practically no sliding action of the members in the piston groove and but very little sliding movement between the ridges 14 and the rails. Hence friction and wear are greatly reduced.

It will be understood that modifications and changes in the configuration and proportions of the spacer-expander elements may be made without departing from the spirit of the invention or the scope of the appended claims.

I claim:

1. A piston ring structure adapted for use in a ring groove of a piston of an internal combustion engine, comprising a pair of flat, thin, split rails having parallel faces adapted to be disposed along the opposite sides of a ring groove, and a plurality of independent spacer-expander elements of spring ribbon each element having a body portion and end portions, the body portion of each element being adapted to engage at spaced points the bottom of the ring groove and the inner peripheries of the rails and the end portions being of reduced width and extending toward each other a substantial distance and adapted to project between the rails and maintain them in spaced relation.

2. A piston ring structure adapted for use in a ring groove of a piston of an internal combustion engine comprising a pair of flat, thin, split rails having parallel faces adapted to be disposed along the opposite sides of a ring groove, and a plurality of independent spacer-expander elements of spring ribbon, each element having a body portion and end portions, the middle of the body portion of each element being adapted to engage the bottom of the ring groove and the ends of the body portions being adapted to engage the inner peripheries of the rails to expand the rails against the cylinder wall, and the end portions of each element being arranged to project between the rails and extend a substantial distance toward each other and being of a width corresponding to the desired axial spacing of the rails.

3. A piston ring structure adapted for use in a ring groove of a piston of an internal combustion engine, comprising a pair of flat, thin, split rails having parallel faces adapted to be disposed along the opposite sides of a ring groove, and a plurality of independent spacer-expander elements of spring ribbon, each element having a body portion and end portions, the middle of the body portion of each element being adapted to engage the bottom of the ring groove and the ends of the body portion having ridges engaging the inner peripheries of the rails to expand the latter against a cylinder wall, and the end portions of each element being oppositely curved adjacent the ends of the body portion and then extending a substantial distance toward each other and the opposite edges of said end portions being straight and adapted to engage the facing sides of the rails to axially space and maintain the rails apart.

4. A spacer-expander element for piston ring structure having thin, split rails axially spaced apart with their outer peripheries adapted to engage a cylinder wall, which comprises a thin spring ribbon member having a body portion and end portions, the body portion being of a width slightly less than the width of a piston ring groove and being adapted to have its middle engage the bottom of the groove and its ends to engage the inner peripheries of the rails to expand the same, and the end portions extending a substantial distance toward each other and being of lesser width than the body portion and adapted to project between the rails to axially space and maintain the rails apart.

5. A spacer-expander element for piston ring structure having thin, split rails axially spaced apart with their outer peripheries adapted to engage a cylinder wall, which comprises a thin spring ribbon member having a body portion and end portions, the body portion being of a width slightly less than the width of a piston ring groove and being adapted to have its middle engage the bottom of the groove and its ends to engage the inner peripheries of the rails to expand the same, and the end portions having their parts adjacent the ends of the body portion oppositely curved outwardly and their parts beyond the curved parts projecting toward each other a substantial distance and substantially concentric with the rails, and the edges of the end portions being straight and adapted to engage the facing sides of the rails to space and maintain the rails apart.

MACY O. TEETOR.